July 29, 1941.  L. F. ARGENTIN  2,250,617
WELDING
Filed Sept. 3, 1938

INVENTOR:
Lucien F. Argentin
BY
John P. Tarbox
ATTORNEY

Patented July 29, 1941

2,250,617

UNITED STATES PATENT OFFICE 2,250,617

WELDING

Lucien F. Argentin, Philadelphia, Pa., assignor to Edward G. Budd Manufacturing Company, Philadelphia, Pa., a corporation of Pennsylvania Application September 3, 1938, Serial No. 228,305

8 Claims. (Cl. 219—10)

This invention relates to the art of welding and more particularly to the art of welding a plurality of layers of metal with a single spot weld, with the assurance that the weld nugget or fused portion will extend a safe and sufficient distance into the outside layers, particularly where the latter are relatively thin.

In regular standard welding practice, it has been considered unsafe to weld more than four layers of material of uniform thickness with a single weld or, in other words, to secure an outside layer in a multiple layer spot weld, where that outside layer constitutes less than 25% of the entire thickness and is relatively thin. Satisfactory welds may have been effected where the outside layers constitute less than 25% of the whole, but assurance of consistency, where a series of welds are effected, has not been obtained. Spot welding without consistency constitutes a hazard. In order for spot welding to be of the maximum advantage, and to have considerable advantage over other fastening means such as rivets, it is necessary that welds be consistent and reliable. Each weld must penetrate into the outside thicknesses of metal. Where the outside layer is very thin, the welding electrode, usually of copper, conducts the heat away from the outside layer and prevents the layer from reaching a welding temperature, unless unusually heavy currents are employed, which may result in overheating the inner layers.

Spot welding, where the number of thicknesses do not exceed four, has in recent years been found capable of being subjected to reliable tests, and it has been found that with a given electrode pressure, that if the proper current flows for the proper length of length, in addition to other possible factors of control, proper full strength and consistent welds can be assured. Through consistent and full strength welds, increased strength per unit weight over other fastening means is obtained. Where a plurality of thicknesses of sheet metal and where thin sheets form the outside layers, the ability to safely determine, with assurance, the strength and condition of a weld, or the penetration of the weld nugget into the outer layers, which is essential for a proper weld, becomes increasingly difficult through instrument measurement. It is, of course, impossible to physically observe the actual weld results without actually sectioning the weld for examination. The present invention relates to the art of welding a stack of material, and assuring consistent proper welds extending throughout and well into the outside layers of the stack and particularly where the outside layers are relatively thin. To accomplish such results, it has been discovered that by adding an additional thin layer to the outside strip of the stack, and applying the proper current, the weld nugget can be consistently caused to penetrate well into the outside layer for a proper weld, after which the thin additional layer, which has prevented rapid heat transfer to the electrode, is removed.

Accordingly, it is an object of this invention to provide in the art of spot welding, a novel method for consistently welding thin outside members to a stack or plurality of thickness of metal and assuring the penetration of the weld nugget into the outside layer a safe and proper distance whereby a satisfactory weld may be assured.

Another object of the invention is to provide a method of spot welding multiple thicknesses of metal by welding through thin additional layers which are subsequently removed and by which method there is assured a satisfactory weld extending well into the outside layers, and which results in a weld of relatively improved appearance and reduced bulging or bowing of the outside layers in the area surrounding the welds.

Still another object of the invention is to produce satisfactory consistent spot welds in multiple layers of sheet metal, each weld so produced penetrating the outer layers a sufficient amount and having a better appearance with less bulging of the layers around the weld.

The above and other novel features of the invention will appear more fully from the following description and accompanying drawing. It is expressly understood, however, that the drawing is employed for purposes of illustration only and are not designed as a definition of the limits of the invention, reference being had for this purpose to the appended claims.

Figure 1:
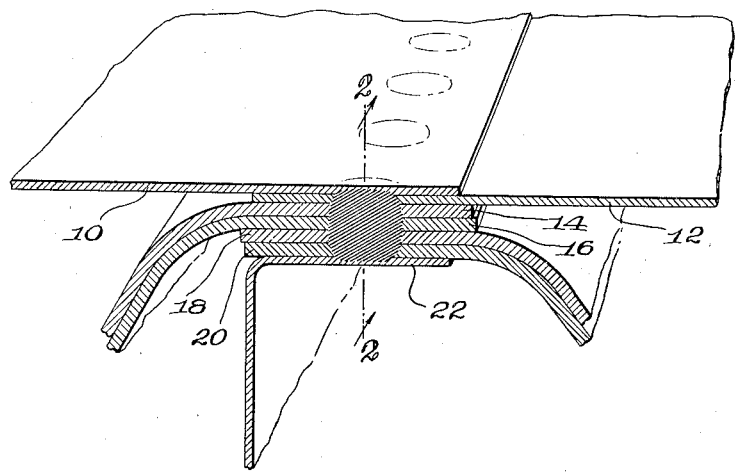
Fig. 1 illustrates a multiple layer pile such as may commonly appear in sheet metal structures.
Figure 2:
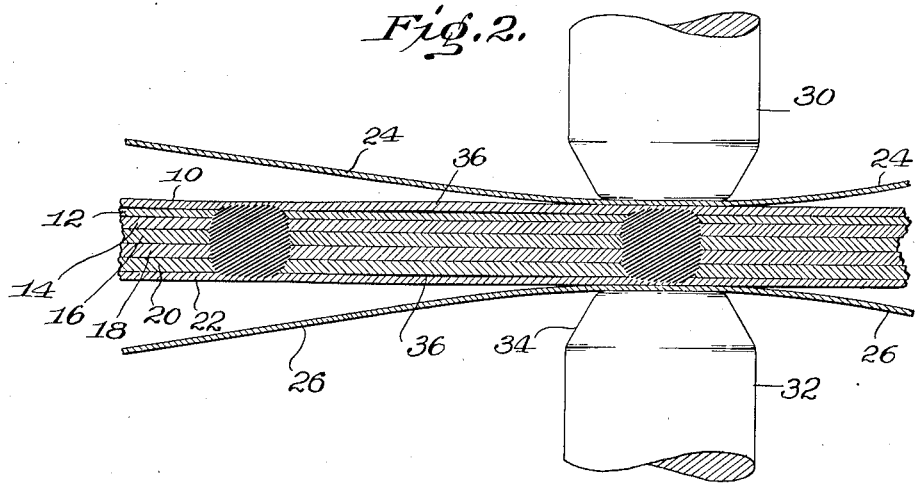
Fig. 2 illustrates an enlargement of Fig. 1 taken on the line 2—2 and showing features of the actual welding and a resultant weld.

Referring to Fig. 1, there is shown an enlarged illustration of a joint between the skin surfaces of an airplane wing in which the skin sheets are backed by multiple thicknesses of corrugated metal. In the present instance, the sheets are composed of 18—8 stainless steel.

More in detail, the outer skin or sheet 10, and the adjacent sheet 12 can be approximately .008" thick each, the succeeding four layers, 14, 16, 18 and 20 corrugated sheets, each of which may have a thickness of .014" and the final or lower outside layer 22 may be a flanged stiffening member with a thickness of .006". Such a pile up is given merely by way of illustration to show a structural joint which has heretofore been considered unsafe to weld because of the inability to determine the state of the individual welds with relation to their penetration into the outer sheets and because tests have shown such welding to be hazardous and extremely inconsistent.

The present invention relates to the making of consistent strong welds in such a pile up. By placing thin layers of stainless steel 24 and 26 immediately on top and bottom of approximately .004 thickness and by applying the proper welding current for a proper time and with correct pressure, consistent strong welds are effected and subsequently the thin layers are peeled off. In the specific pile up illustrated, the total thicknesses of the seven elements composing the structure is approximately .078". The outer layers 10 and 22 are but approximately 10% and 8% respectively of the entire thickness; yet if the welding current be applied through the thin layers 24 and 26, consistent welds will take place in the seven layers, each nugget extending or penetrating approximately 50% of the thickness of the outer layers 10 and 22. The weld does not extend through outside layers of the stack and hence not into the thin additional layers 24 and 26 and thus, no trouble in removing the thin strips is encountered.

If in the example set forth, welding electrodes 30 and 32 of $\frac{7}{16}$" diameter be used with the usual slight chamfer 34, with a pressure of 350 lbs. and an approximate current of 4000 amperes at a frequency of 60 cycles for approximately 5 cycles, not only are consistent welds produced, but after peeling the thin strips 24 and 26 from the pile, it is observed that materially less weld indentation has resulted, thus providing a more sightly and less noticeable weld. The extra thin layer also has the effect, where a series of closely spaced welds are made, of reducing the bulging or bowing 36 of the layers between welds. Where pressure is directly applied between welding electrodes to a plurality of layers, without the thin intermediate members, the bulging effect is considerably exaggerated. The thin layers such as 24 and 26 tend to spread the pressure and maintain the layers against such bulging.

The presence of the thin layers also reduces the welding current by approximately one-half over that which would be required if attempt were made to weld the seven layers by direct contact between welding electrodes. This lower current reduces the heating to a considerable extent and assists in making a clean appearing weld, and where stainless steel is used, prevents the steel from rising to such a temperature as would be deleterious to its corrosion resisting properties.

The novel results attained appear to result from the fact that the additional thin strips 24 and 26 prevent the welding electrodes from relieving the outside layers of the pile of necessary welding heat, and the thin strip itself does not become a part of the welded pile because its temperature is maintained relatively cool both by the electrode and the thin strip which acts as a radiating fin. The resulting welding nugget is somewhat rectangular, extending well into the outside layers and having a considerable and approaching maximum shear cross section between the outside layer and the adjacent inner layer. Where such additional thin strips are added for assuring proper welding, the control becomes less subject to irregularities, such as might be due to current variation, pressure changes, changes in electrode tip, foreign matter between layers or slight deformations in any of the layers.

The invention also has application where any outside thin member is to be welded to a thicker member, difficulty being always experienced in such welds in forming a weld, the nugget of which will extend substantially 50% into the thin member. By the mere addition of a thin member, such as 24 or 26, outside of the outer member, uniform and consistent welds may be formed, the nuggets of which can be relied upon to extend well into the thin member, and, as before, the additional member may be subsequently peeled off.

In practice where a series of welds are to be made, the thin strips 24 and 26 may be loosely tacked in place by one or more light welds or by any suitable means, and after all the welds are completed, the thin strips peeled off. Although there may be a slight sticking tendency between the strips and the welded pile, because of the heat and current which has passed therethrough, the strips are easily peeled from the pile by hand leaving the pile with relatively clean and smooth weld spots.

Conducting the welding in accordance with the principles herein described permits the use of weld indicators, i. e. current and time recorders, since the welds are of such a consistent nature that indications from a recorder can be relied upon to positively indicate the good and bad welds.

While the specific illustrative example has related to aircraft, where stainless steel is used because of its high strength, it should of course be obvious that the same principles apply to other steels and weldable metals. The thin additional layers, however, should be of a metal which will not fuse at a low temperature to the outer layers to be welded and, therefore, should best be of a metal having similar characteristics to the pile to be welded.

Although the invention has been illustrated and described in conjunction with one specific example, it is to be understood that the principles may be applied to solve a plurality of different but analagous problems in producing consistent safe welding. Since many changes may be made in the process and manner of effecting the welds without departing from the spirit or substance of the invention, as will be apparent to those skilled in the art, reference should be had to the appended claims for a definition of the limits of the invention.

What I claim is:

1. The method of resistance spot welding a plurality of sheets together, in which one of the outside sheets bears such a thickness in relation to the remainder as to preclude due to the chilling effect of the electrode, the formation of a single welding nugget having a satisfactory projection into the outer sheet and thereby resulting in a defective weld, which comprises laying an additional thin strip of material having heat conductivity similar to that of the sheets over the outside sheet, engaging the plurality of sheets and additional strip between welding electrodes, passing a welding current through the sheets and additional strip sufficient to form a single weld nugget extending substantially fifty percent (50%) of the thickness into the outside sheet, but not into the additional strip, removing the electrodes, and thereafter removing the extra strip.

2. The method of resistance spot welding a plurality of sheets together, in which one of the outside sheets bears such a thickness in relation to the remainder as to preclude due to the chilling effect of the electrode, the formation of a single welding nugget having a satisfactory projection into the outer sheet and thereby resulting in a defective weld, which comprises laying an additional thin strip of material having heat conductivity similar to that of the sheets over the outside sheet, engaging the plurality of sheets and additional strip between welding electrodes, passing a welding current through the sheets and additional strip sufficient to form a single weld nugget having a satisfactory penetration into said outside sheet, but not sufficiently close to said additional strip as to cause adherence thereof to the plurality of sheets, removing the electrodes, and thereafter removing the extra strip.

3. The method of resistance welding a plurality of superimposed thin layers together which comprises adding additional top and bottom layers of the same material, passing a welding current through all the layers sufficient to fuse a single nugget from all the layers but not completely through the layers adjacent the additional top and bottom layers whereby the additional top and bottom layers are left readily removable and non-adhering, and thereafter removing the additional layers.

4. The method of resistance welding a plurality of superimposed thin layers of stainless steel together which comprises adding additional top and bottom layers of the same material, passing a welding current through all the layers of stainless steel sufficient to fuse a single nugget from all the layers but not completely through the layers adjacent the additional top and bottom layers of stainless steel whereby the additional top and bottom layers are left readily removable and non-adhering and thereafter removing the additional layers of stainless steel.

5. The method of resistance welding a plurality of superimposed thin layers together which comprises adding an additional layer of the same material, passing a welding current through all the layers sufficient to fuse a single nugget from all the layers but not completely through the layer adjacent the additional layer, whereby the additional layer is left readily removable and non-adhering, and thereafter removing the additional layers.

6. The method of resistance welding a plurality of superimposed thin layers together which comprises adding an additional layer of material having characteristics similar to that of the thin layers with regard to heat conduction, passing a welding current through all the layers sufficient to fuse a single nugget from all the layers but not completely through the layer adjacent the additional layer, whereby the additional layer is left readily removable and non-adhering, and thereafter removing the additional layers.

7. The method of resistance welding a plurality of superimposed thin layers together which comprises adding additional top and bottom layers of material having characteristics similar to that of the thin layers with regard to heat conduction, passing a welding current through all the layers sufficient to fuse a single nugget from all the layers but not completely through the layers adjacent the additional top and bottom layers whereby the top and bottom layers are left readily removable and non-adhering, and thereafter removing the additional layers.

8. The method of resistance welding a plurality of superimposed thin layers together which comprises adding an additional layer of material having characteristics similar to that of the thin layers with regard to melting temperature, passing a welding current through all the layers sufficient to fuse a single nugget from all the layers but not completely through the layer adjacent the additional layer, whereby the additional layer is left readily removable and non-adhering, and thereafter removing the additional layers.

LUCIEN F. ARGENTIN.